US008913460B2

(12) United States Patent
Pistre et al.

(10) Patent No.: US 8,913,460 B2
(45) Date of Patent: Dec. 16, 2014

(54) METHODS AND APPARATUS TO CALCULATE A DISTANCE FROM A BOREHOLE TO A BOUNDARY OF AN ANISOTROPIC SUBTERRANEAN ROCK LAYER

(75) Inventors: Vivian Pistre, Beijing (CN); Jakob Brandt Utne Haldorsen, Hvalstad (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 372 days.

(21) Appl. No.: 13/587,931

(22) Filed: Aug. 17, 2012

(65) Prior Publication Data

US 2012/0307592 A1 Dec. 6, 2012

Related U.S. Application Data

(62) Division of application No. 12/547,464, filed on Aug. 25, 2009, now abandoned.

(51) Int. Cl.
*G01V 1/28* (2006.01)
*G01V 1/50* (2006.01)

(52) U.S. Cl.
CPC ........................................ *G01V 1/50* (2013.01)
USPC .................................. 367/27; 367/25; 367/53

(58) Field of Classification Search
CPC ............. G01V 1/50; G01V 1/30; G01V 1/40; G01V 1/364; G01V 1/52; G01V 1/42; E21B 47/011; E21B 7/011; E21B 7/04; E21B 47/02208
USPC ............................................... 367/27, 25, 53
See application file for complete search history.

(56) References Cited

U.S. PATENT DOCUMENTS

| 6,308,137 | B1 | 10/2001 | Underhill et al. |
| 6,574,562 | B2 | 6/2003 | Tabarovsky et al. |
| 6,636,045 | B2 | 10/2003 | Tabarovsky et al. |
| 6,785,612 | B1 | 8/2004 | Zhang |
| 2008/0298174 | A1* | 12/2008 | Tang et al. ...................... 367/27 |
| 2009/0052280 | A1* | 2/2009 | Herrmann et al. ............... 367/53 |
| 2010/0027376 | A1* | 2/2010 | Washbourne et al. .......... 367/25 |

OTHER PUBLICATIONS

Pascal Breton et al., "Well-Positioned Seismic Measurements" Oilfield Review, Spring 2002, pp. 32-45.

* cited by examiner

*Primary Examiner* — Daniel L Murphy
(74) *Attorney, Agent, or Firm* — Daryl R. Wright; Brigitte Echols

(57) ABSTRACT

A disclosed example method includes providing, in a borehole, a transmitter (Tx) and receivers (Rxs) spaced linearly from Tx at known distances, measuring linear propagation times (LPts) for a signal to propagate from Tx to each of Rxs, determining an inline velocity ($V_{INL}$) based on LPts, measuring reflection times (Rts) for a signal to propagate from Tx to each of the Rxs via a boundary, for each of Rts, providing a time-distance anisotropic velocity (TDAV) relationship depending on an effective signal velocity (ESV) in an anisotropic formation adjacent the boundary as a function of reflection angle for the reflection time signal to the boundary, $V_{INL}$ and orthogonal velocity, performing semblance processing to combine the TDAV relationships with $V_{INL}$ for a best-fit calculation of the ESVs for the different reflection angles of the reflection time signals, and calculating a distance for the corresponding receiver to the boundary on the calculation.

12 Claims, 10 Drawing Sheets

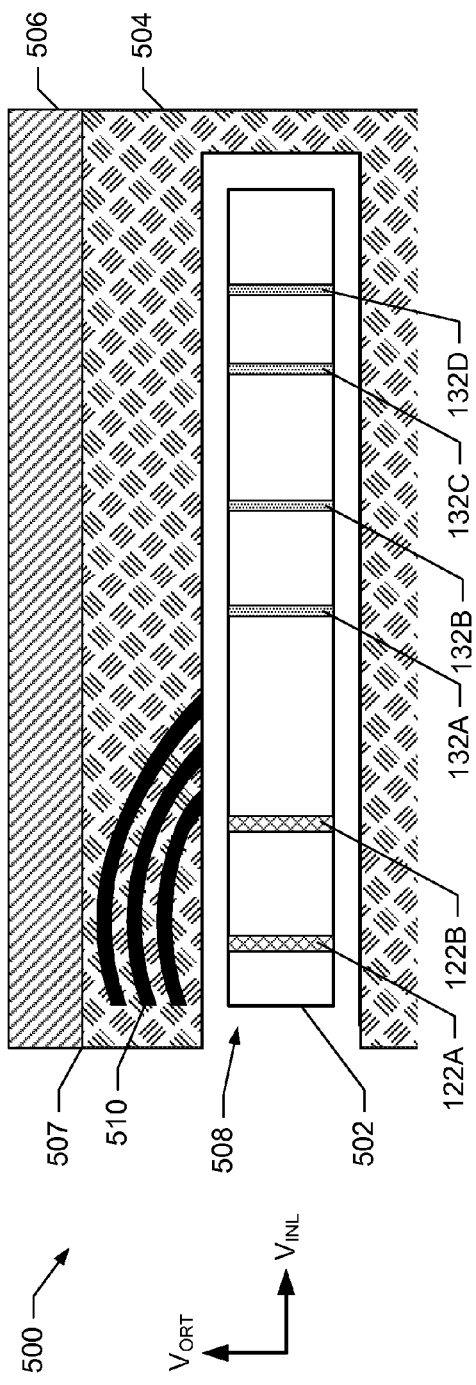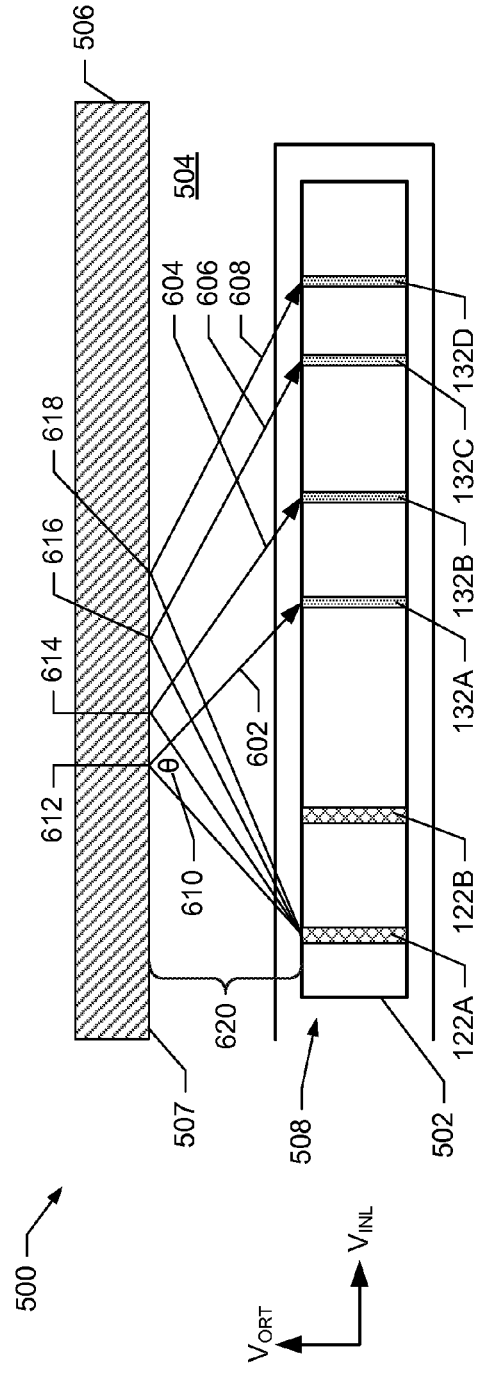

METHODS AND APPARATUS TO CALCULATE A DISTANCE FROM A BOREHOLE TO A BOUNDARY OF AN ANISOTROPIC SUBTERRANEAN ROCK LAYER

CROSS-REFERENCE TO RELATED APPLICATION

This application is a divisional application of U.S. patent application Ser. No. 12/547,464, filed Aug. 25, 2009.

FIELD OF THE DISCLOSURE

This disclosure relates generally to oil production and, more particularly, to methods and apparatus to calculate a distance from a borehole to a boundary of an anisotropic subterranean rock layer.

BACKGROUND

Oil and gas producers typically image subterranean rock layers to determine the location and shape of the subterranean rock layers. Such imaging may also be used to identify a boundary between the subterranean rock layer and an adjacent subterranean rock layer. The imaging is often performed using an imaging tool disposed within a borehole drilled into the subterranean rock layer to be imaged.

Identifying a boundary of a subterranean rock layer is an important aspect of oil or gas well production. For example, identifying such a boundary of a rock layer enables oil or gas producers to plan well locations to efficiently and optimally extract oil or gas. Additionally, knowing the boundary of a rock layer may prevent oil and gas producers from drilling into undesired rock layers.

Currently, subterranean rock layer boundaries are imaged and/or measured by time-indexed waveforms or signals that are emitted by a transmitter and received by sensors or receivers. These receivers are located a distance away from the transmitter in a borehole. Typically, the transmitter(s) may be located on the surface while the receivers are located in a borehole. The signal emitted from the transmitter(s) propagates through the rock layer being logged, reflects and/or refracts off of a boundary of the rock layer, and is received by the receivers. The waveforms or signals received by the receivers may be processed using signal migration to determine the distance between the receivers in the borehole and the rock layer boundary. However, the velocity of the waveforms or signals may be affected by anisotropic properties in the logged rock layer or boundary such as faults in the rock layer, cracks in the rock layer, a change in lithology in the rock layer or a change in an unconformity within the rock layer.

SUMMARY

Example methods and apparatus to calculate a distance from a borehole to a boundary of an anisotropic subterranean rock layer are described. An example method includes transmitting a first signal from a first transmitter at a first location in a borehole traversing a subterranean formation, receiving the first signal at a first receiver after a first time period at a second location in the borehole, and receiving the first signal at a second receiver after a second time period at a third location in the borehole. Additionally, the example method includes calculating a first distance from the first transmitter to a first portion of a boundary of a subterranean rock layer adjacent to the borehole by compensating for an anisotropy of the subterranean rock layer based on the first time period and the second time period.

An example apparatus includes a transmitter at a first location to transmit a first signal within a borehole of a subterranean rock layer, a first receiver at a second location in the borehole to receive the first signal after a first time period, and a second receiver at a third location in the borehole to receive the first signal after a second time period. The example apparatus further includes a formation processor to calculate a first distance from the first transmitter to a first portion of the boundary of the subterranean rock layer by compensating for an anisotropy of the subterranean rock layer based on the first time period and the second time period.

Alternatively, the example apparatus includes a formation processor to calculate a first distance from a first transmitter to a first portion of the boundary of a subterranean rock layer by compensating for an anisotropy of the subterranean rock layer based on a first time period and a second time period corresponding to a first signal.

BRIEF DESCRIPTION OF THE DRAWINGS

FIG. 5 shows an example seismic imaging tool within a subterranean rock layer.

FIG. 6 shows the seismic imaging tool transmitting and receiving signals affected by anisotropy within the subterranean rock layer of FIG. 5.

DETAILED DESCRIPTION

Figure 1A:
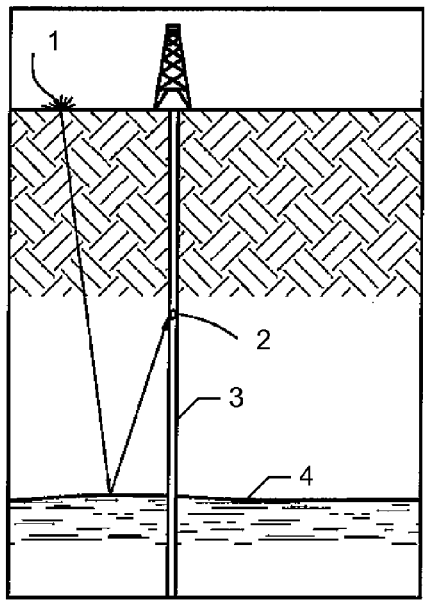
FIGS. 1A-1D show typical seismic-while-drilling tools with one or more transmitters located at the surface.

Certain examples are shown in the above-identified figures and described in detail below. In describing these examples, like or identical reference numbers are used to identify common or similar elements. The figures are not necessarily to scale and certain features and certain views of the figures may be shown exaggerated in scale or in schematic for clarity and/or conciseness. Although the following discloses example systems including, among other components, software or firmware executed on hardware, it should be noted that such systems are merely illustrative and should not be considered as limiting. For example, it is contemplated that any form of logic may be used to implement the systems or subsystems disclosed herein. Logic may include, for example, implementations that are made exclusively in dedicated hardware (e.g., circuits, transistors, logic gates, hard-coded processors, programmable array logic (PAL), application-specific integrated circuits (ASICs), etc.) exclusively in software, exclusively in firmware, or some combination of hardware, firmware, and/or software. Accordingly, while the following describes example systems, persons of ordinary skill in the art will readily appreciate that the examples are not the only way to implement such systems. Further, the examples may be implemented by acoustic signals that may include seismic signals, sonic signals, ultrasonic signals and/or any other shear and/or compression signals.

Currently, oil and/or gas producers use time-indexed waveforms of a signal to image a boundary of a subterranean rock layer adjacent to a wellbore or a borehole. The frequency, amplitude, and/or energy of the signal are specified so that the signal can propagate through the rock layer being logged but reflect off a boundary of the rock layer. For example, a signal having a frequency of 8000 Hertz (Hz) may be specified to enable the signal to propagate through a first rock layer. However, a signal at this frequency may reflect off a boundary of the rock layer. The boundary may include a change in rock type from the subterranean rock layer being logged to a second type of rock in a second subterranean rock layer, a change in a lithology of the subterranean rock layer, a change in a fault of the subterranean rock layer, or a change in an unconformity within the subterranean rock layer.

The boundary is imaged by transmitting one or more acoustic signals from a transmitter and recording when the signals are received by one or more receivers. Each receiver may include one or more sensors circumferentially located around the receiver so that each sensor may detect the transmitted signal from a specified direction. The sensors may include any type of transducer to convert a detected acoustic (e.g., seismic, sonic, ultrasonic, etc.) signal into an electrical signal and/or impulse decipherable by a microcontroller, a transistor, and/or a processor. By aligning the sensors in specified directions, oil and/or gas producers can determine the direction from which a signal was reflected. Typically, one or more transmitter(s) are located at the surface in proximity of a well site while receivers are included within a tool that is placed within a wellbore or borehole of a rock layer bring logged.

In examples where one or more receivers are included within a tool located in a borehole, the location of the receivers within the tool may be fixed. In the case where the receiver locations are fixed, the distance between each transmitter on the surface and each receiver is known. In addition to knowing the distances between transmitter(s) and receivers, oil and gas producers can determine the time for a signal to propagate from a transmitter to each receiver based on a logging and control processor that measures the time period between the signal being transmitted and the time at which each receiver receives the signal.

Figure 1B:
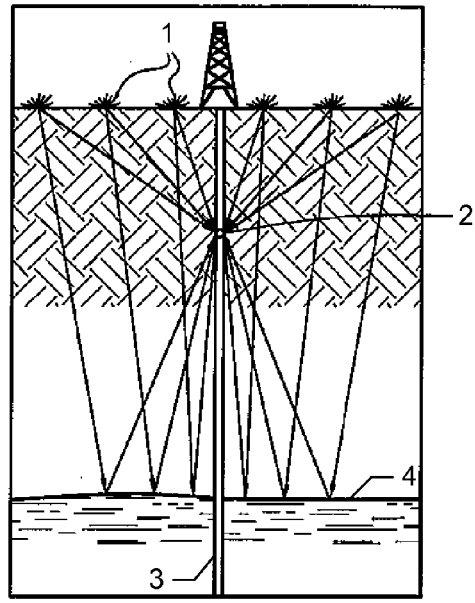
Figure 1C:
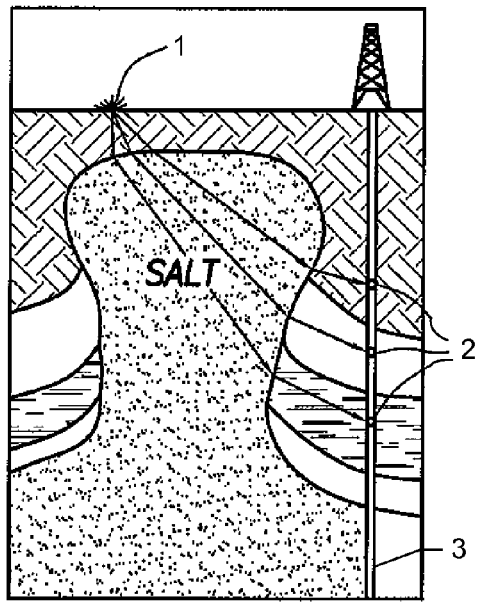
Figure 1D:
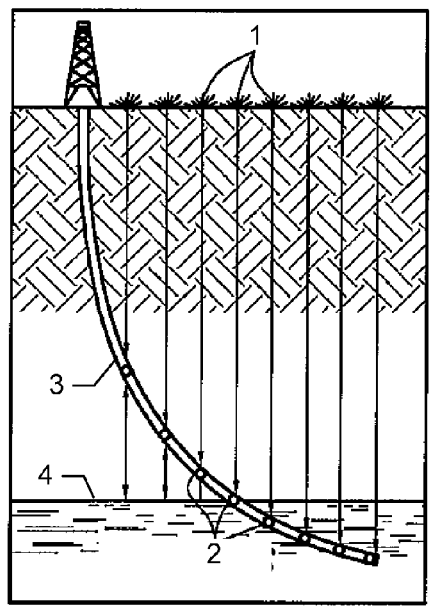

FIGS. 1A-1D show typical seismic-while-drilling tools that include one or more transmitters 1 at the surface and one or more receivers 2 in a borehole 3. FIGS. 1A and 1B show that the downhole tool may include a single receiver 2 in the borehole 3. Additionally, FIGS. 1A and 1C show that a single transmitter 1 may be implemented as a single seismic (e.g., signal) source, while FIGS. 1B and 1D show a plurality of the transmitters 1 providing respective seismic sources. FIG. 1B shows the receiver 2 receiving reflections and direct signals from the transmitters 1, while FIGS. 1C and 1D show multiple receivers 2 receiving signals directly from the one or more transmitters 1.

Seismic images may be generated from the arrangements of the transmitter(s) 1 and the receiver(s) 2 of FIGS. 1A-1D. FIG. 1A shows a reflection of the signal off a rock layer boundary or bed boundary 4. The seismic imaging of the bed boundary generates a 'zero-offset' vertical seismic profile arrangement. FIG. 1B shows a reflection of the signals off the bed boundary 4. This seismic imaging generates a 'walkway' vertical seismic profile arrangement. FIG. 1C shows a refraction through salt dome boundaries. This seismic imaging generates a 'salt proximity' vertical seismic profile. FIG. 1D includes signal reflections off the rock layer boundary 4 and/or some direct signals from the transmitter 1. This seismic imaging generates a 'walk above' vertical seismic profile. The vertical profiles and/or arrangements referred to in FIGS. 1A-1D are labeled vertical because the receiver(s) 2 are oriented vertically along the borehole 3.

Furthermore, each receiver(s) 2 may include sensors evenly spaced around the circumference of the receiver. To determine the distance from the tool in the borehole 3 to a first portion of the boundary 4 of a rock layer, the transmitter(s) 1 transmits a first signal. This first signal propagates in all directions through the rock layer. When the signal reaches the boundary 4 of the rock layer, the signal reflects back to the borehole 3. The receiver(s) 2 may then detect the reflected signal. Similarly, a second signal may be transmitted by the transmitter(s) 1 and received by the receiver(s) 2 after reflecting off the boundary 4. The distance to the boundary 4 can be related to the time for the first signal to reach each receiver 2, the distance from each of the receiver(s) 2 to the transmitter 1, and the velocity of the first signal. There may be a separate time-distance relationship for each sensor within the receiver 2 that receives the reflected first signal. Similarly, the time for the second signal to reach each of the receivers 2, the distance from the receivers 2 to the transmitter(s) 1, and the velocity of the signal can be related to the distance to the boundary 4. These relationships may then be combined into a semblance model to calculate the distance to a portion of the boundary 4.

In other typical examples, a sonic tool may be located within the borehole 3. However, in these cases, the signal velocity determined from the velocity of the signal in the direction (i.e., parallel to the longitudinal axis) of the borehole 3 (e.g., the inline velocity) may differ from the velocity of the signal propagating through the rock formation. The velocity of the signal may differ in this manner due to anisotropy in the rock layer. For example, an inline signal may have a velocity that differs by 20% compared to a signal traveling in a direction perpendicular or orthogonal to the borehole due to anisotropy in the rock layer. More generally, the signal velocity may differ or vary based on an angle of signal propagation, which may range from a direction along (i.e., parallel to) the longitudinal axis of the borehole to a direction perpendicular to the longitudinal axis of the borehole. For example, if the anisotropy is uniform in the rock layer, a signal traveling at an angle of 22 degrees from the longitudinal axis of the borehole may have a velocity that is 5% slower than a signal traveling in the inline direction (i.e., along the longitudinal axis) of the borehole.

Figure 2:
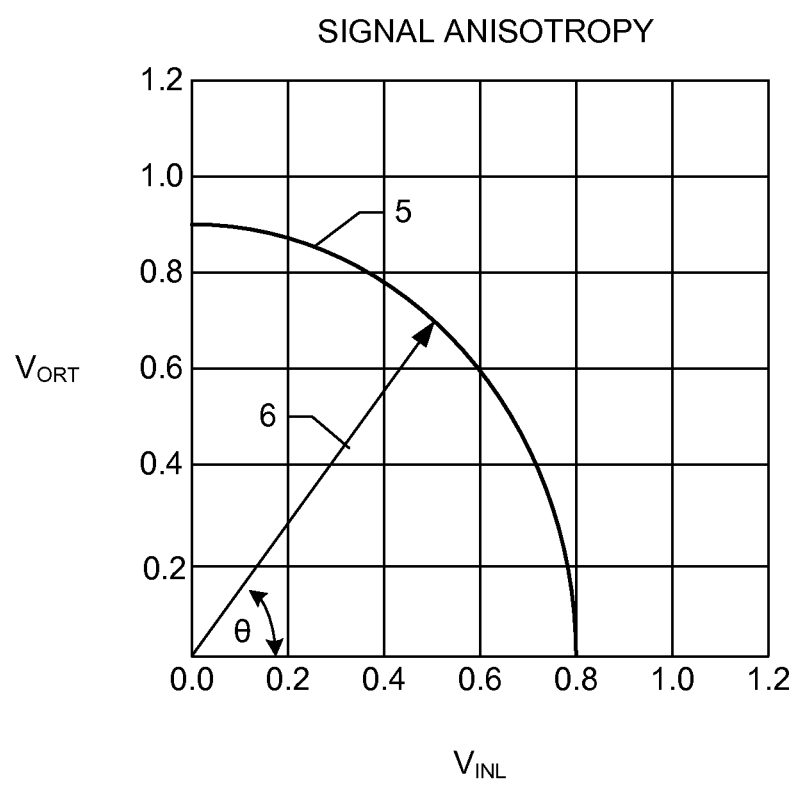
FIG. 2 shows a graph representing the effect of anisotropy within a subterranean rock layer.

FIG. 2 shows a graph defining an example of anisotropy within a subterranean rock layer. The x-axis shows a normalized inline signal velocity ($V_{INL}$) and the y-axis shows a normalized orthogonal and/or perpendicular signal velocity ($V_{ORT}$). The inline signal velocity corresponds to a velocity of the signal in the formation along an axis parallel to a borehole, where the signal is sent from a transmitter directly to a receiver. An anisotropy velocity line 5 shows a velocity of a signal based on an angle of propagation (e.g., $\theta$). The angle of propagation is an angle at which a signal propagates through a rock layer. If the signal is reflected back to the receivers by a boundary of a rock layer that is parallel to the wellbore, Snell's Law of Reflection indicates that the angle at which the signal travels when transmitted by a transmitter, the angle at which the signal is reflected off of the boundary of a rock layer, and the angle at which the signal is received at a receiver are substantially the same angle. Thus, a signal propagating through a uniform rock layer should have a constant anisotropic velocity based on the angle of transmission and reception, which is also equal to the angle of propagation for a reflector parallel to the wellbore.

As a result of anisotropy, a signal propagating in the inline direction may have a normalized signal velocity of 0.8 while a signal propagating in the orthogonal direction may have a normalized signal velocity of 0.9. Thus, in this example, the signal propagating in the orthogonal direction is 12.5% faster than the signal propagating in the inline direction. The example in FIG. 2 shows a signal 6 having an angle of propagation θ. Based on the anisotropy velocity line 5, the signal 6 propagating through a rock formation at an angle of θ may have a normalized anisotropic velocity of 0.86 (e.g., the length of the vector representing the signal 6 from the origin to the velocity line 5).

FIG. 2 shows the anisotropy velocity line 5 as approximately linearly dependent on the angle of propagation (e.g., 0.8 in the $V_{INL}$ direction to 0.9 in the $V_{ORT}$ direction). However, in other examples, anisotropy may be exponentially dependent, logarithmically dependent, Gaussian dependent, inversely dependent, and/or may exhibit any other types of functional dependence on the angle of propagation. In yet other examples, the anisotropy may not depend on the angle of propagation. However, the example methods and apparatus described herein compensate for any type of anisotropy that varies based on the angle of propagation.

As noted above, anisotropy may result from faults in a rock layer, cracks in a rock layer, a change in lithology in a rock layer, and/or a change in an unconformity within a rock layer. Not compensating for anisotropy within a rock layer may create errors in determining a distance of a rock layer boundary from a sonic and/or seismic imaging tool. The error may result from assuming that the signal velocity is uniform in all directions. In practice, when a rock layer is affected by anisotropy, the signal velocity may differ significantly from the inline signal velocity based on the angle of propagation. Furthermore, because the angle of propagation of the signal received by each receiver and/or sensor is different for each receiver, the signal velocities may be different based on these different angles. As a result of the difference between the inline signal velocity and the anisotropic signal velocity, the calculated distance to the boundary may be significantly different from the actual distance.

The difference between the calculated distance and the actual distance may result in oil or gas producers drilling wellbores or boreholes in rock layers that may not contain the desired natural resources, improperly routing boreholes through rock layers with natural resources, and/or drilling into undesired rock formations in a manner that weakens the subterranean rock formations and/or diluting target formations with undesired rock formations. Furthermore, oil and/or gas producers do not currently account for anisotropy when imaging and/or determining rock layer boundary locations due to complexities and uncertainties based on the relationship between the signal velocity, the angle of propagation, the distance to the boundary of the rock layer, and the profile of anisotropy associated with the rock layer.

The example methods and apparatus described herein may be used to calculate the shape and/or boundary of a rock layer or a distance from a tool to a rock layer boundary by compensating for the anisotropy in the rock layer. The example methods and apparatus may be used to compensate for the anisotropy by analyzing relationships between time periods and distances between transmitter(s) and receivers and solving for the angle of each signal received at a receiver to determine an effective anisotropic signal velocity. In particular, the example methods and apparatus described herein use the calculated anisotropic signal velocity for the signal received by each receiver and/or sensor to determine the distance to a portion of the rock layer boundary.

The example methods and apparatus also include one or more transmitters within the tool that includes the receivers. Because the transmitter(s) and receivers are included inline within the same tool, the relationship between the tool and the distance to a rock layer boundary can be determined using the signal propagation time, the distance between the transmitter(s) and receivers, and the signal velocities. Equation 1 below shows the relationship between the time for a receiver to receive the reflected signal (i.e., T), the distance from the receiver to a transmitter that transmitted the signal (i.e., a), the anisotropic signal velocity (i.e., $V_θ$), and the distance from the tool to the boundary (i.e., X), for a boundary parallel to the wellbore.

$$T = \frac{\sqrt{(2X)^2 + a^2}}{V_θ}$$ Equation 1

Equation 1 indicates that the greater a time period (T) for a signal to reach a receiver, the greater the distance (X) between the boundary and the tool based on a constant signal velocity ($V_θ$) and distance of a receiver to the transmitter (2a). The signal takes a longer time period to be received by receivers farther from the transmitter. This longer time period indicates a lower angle of propagation of the signal with the boundary and a longer distance for the signal to travel to the receiver. In a particular example corresponding to the signal 6 of FIG. 2 having an angle of propagation θ, the effective signal velocity (i.e., $V_θ$) may be expressed as shown in Equation 2 below.

$$V_θ = \frac{V_{INL}(1 - ε^2)}{1 + ε\cosθ}$$ Equation 2

In Equation 2, ε is the difference between the inline velocity (e.g., $V_{INL}$) and a perpendicular velocity (e.g., $V_{ORT}$), divided by the inline velocity. In other examples, Equation 2 may be expressed differently to reflect a different relationship between the signal velocity (i.e., $V_θ$) and the propagation direction θ. FIG. 2 defines θ as an angle of transmission and/or reception of the signal. Further, the inline signal velocity (e.g., $V_{INL}$) is the velocity of the signal measured in the direction of the wellbore or borehole based on a time for the signal to travel linearly from the transmitter to the receivers without reflecting off the boundary.

The inline velocity is known by measuring the time for the signal to propagate linearly from a transmitter to a receiver. By knowing the distance between each transmitter and receiver, the time for a signal to reach each receiver after reflecting off of a rock layer boundary, and the effective velocity of the signal related to the angle of propagation, the example methods and apparatus may use semblance processing to combine the time-distance anisotropic velocity (TDAV) relationship for each transmitter and receiver to model the distance of the boundary as a best-fit model. For example, three transmitters, thirteen receivers, and eight sensors per receiver may yield 312 different transmitter and receiver TDAV relationships. From these relationships, the effective signal velocity dependent upon the angle of propagation and the distance to the rock layer boundary are modeled using a best-fit calculation. Because the distance to the boundary and the angle of propagation within each TDAV relationship are unknown dependent variables, the boundary distance can be expressed as a function of the angle of propagation and the effective anisotropic signal velocity. The best-fit calculation then uses the number of relationships and the known inline signal velocity to solve for the effective signal velocity resulting from the angle of propagation. Upon knowing the effective anisotropic velocity for each relationship, the distance to each reflection point of the rock layer boundary can be calculated using Equation 1.

In examples where the reflecting formation boundary is not substantially parallel to the wellbore, Equation 1 may be modified. For example, if there is an angle between the reflecting boundary of a rock layer and the wellbore axis (e.g., $\phi$), the distance X to the reflecting boundary in the Equation 1 may be replaced with a different relation (e.g., X cos($\phi$)). In this example, the distance X is a distance between a transmitter and a reflecting boundary. Further, the distance between a transmitter and a receiver in Equation 1 may be replaced by a different relation (e.g., a+2X sin($\phi$)). With these different example relations, the relationship between the distance to a rock layer boundary, the distance from a transmitter to a receiver, and the propagation angle remains the same. However, the transmission and/or the reception angle (e.g., $\theta$) may differ by twice the angle between the reflecting boundary and the wellbore axis (e.g., by 2$\phi$). Even in a homogeneous anisotropic formation the transmitted and the received signal may propagate at two different velocities. The effective velocity may be a weighted average of these two different velocities. Nevertheless, the effective velocity provides information about the propagation velocities perpendicular to the wellbore, information that may not be available by any other means. Additionally, the angle $\phi$ between the formation boundary and wellbore axis may be included in parameters determined by a best-fit procedure.

While the example methods and apparatus described herein provide an imaging tool that may include one or more transmitters and/or two or more receivers, the example methods and apparatus may include an imaging tool having any number of transmitters and/or receivers. For example, a sonic and/or seismic imaging tool may include one transmitter and two receivers, with each receiver including a sensor. Alternatively, a sonic and/or seismic imaging tool may include three transmitters and thirteen receivers, with each receiver including eight sensors.

Figure 3:
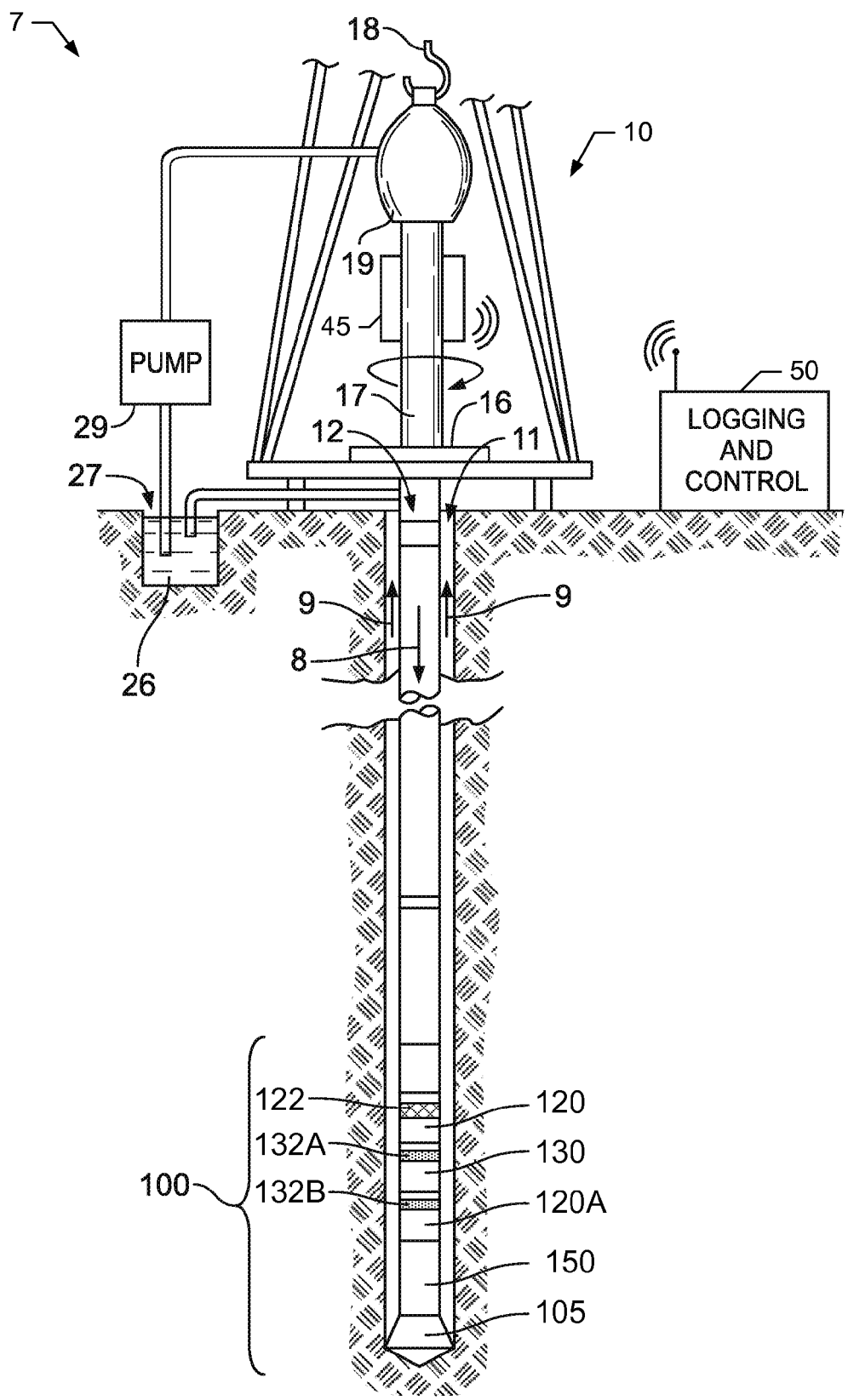
FIG. 3 shows an example wellsite system including a transmitter and receivers to implement the example methods and apparatus described herein.

FIG. 3 shows a wellsite system 7 in which the example methods and apparatus may be implemented. The wellsite system 7 may be onshore or offshore. In the example wellsite system of FIG. 3, a borehole 11 is formed in one or more subsurface formations by rotary and/or directional drilling. A drillstring 12 is suspended within the borehole 11 and has a bottomhole assembly 100 that includes a drill bit 105 at its lower end. The wellsite system 7 includes a platform and derrick assembly 10 positioned over the borehole 11 at the surface. The derrick assembly 10 includes a rotary table 16, which may engage a kelly 17 at an upper end of the drillstring 12 to impart rotation to the drillstring 12. The rotary table 16 may be energized by a device or system not shown. The example drillstring 12 is suspended from a hook 18 that is attached to a traveling block (not shown). Additionally, the drillstring 12 is positioned through the kelly 17 and the rotary swivel 19, which permits rotation of the drillstring 12 relative to the hook 18. Additionally or alternatively, a top drive system (not shown) could be used to impart rotation to the drillstring 12.

In the example depicted in FIG. 3, the wellsite system 7 further includes drilling fluid 26. For example, the drilling fluid 26 may comprise a water-based mud, an oil-based mud, a gaseous drilling fluid, water, gas or other fluid for maintaining bore pressure and/or removing cuttings from the area surrounding the drill bit 105. The drilling fluid 26 may be stored in a pit 27 formed at the wellsite. A pump 29 delivers the drilling fluid 26 to the interior of the drillstring 12 via a port in the rotary swivel 19, causing the drilling fluid 26 to flow downwardly through the drillstring 12 as indicated by directional arrow 8. The drilling fluid 26 exits the drillstring 12 via ports in the drill bit 105 and then circulates upwardly through the annulus region between the outside of the drillstring 12 and the wall of the borehole 11 as indicated by directional arrows 9. The drilling fluid 26 lubricates the drill bit 105, carries cuttings from the formation up to the surface as it is returned to the pit 27 for recirculation, and creates a mudcake layer (not shown) (e.g., filter cake) on the walls of the borehole 11.

Additionally, the wellsite system includes a communications relay 45 and a logging and control processor 50. The example communications relay 45 may receive information and/or data from sensors, transmitters, and/or receivers located within the bottomhole assembly 100. The information may be received by the communications relay 45 via a wired communication path through the drillstring 12 and/or via a wireless communication path. The communications relay 45 transmits the received information and/or data to the logging and control processor 50. Additionally, the communications relay 45 may receive data and/or information from the logging and control processor 50. Upon receiving the data and/or information, the communications relay 45 may forward the data and/or information to the appropriate sensor(s), transmitter(s), and/or receiver(s) within the bottomhole assembly 100.

The example logging and control processor 50 may include a user interface that enables parameters to be input and/or outputs to be displayed. Additionally, the logging and control processor 50 may control imaging of a boundary of a rock layer. For example, the logging and control processor 50 may position the bottomhole assembly 100 and/or a sonic and/or seismic imaging tool within the borehole 11, instruct transmitters to transmit a signal for receivers and/or sensors to receive.

Additionally, the logging and control processor 50 may calculate a distance from the borehole 11 to a portion of a rock boundary based on the transmitted and received signal. Furthermore, the logging and control processor 50 may compensate for anisotropy within the rock layer while calculating the distance from the borehole 11 to a boundary of the rock layer. While the logging and control processor 50 is depicted uphole at the surface and within the wellsite system 7, a portion or the entire logging and control processor 50 may be positioned in the bottomhole assembly 100 and/or in a remote location. The logging and control processor 50 is described in greater detail in conjunction with FIG. 6.

In some examples, the tools of the bottomhole assembly 100 of FIG. 3 may include any number and/or type(s) of logging-while-drilling (LWD) modules or tools (two of which are designated by reference numerals 120 and 120A) that may be housed in respective drill collars. The LWD modules 120 and/or 120A may be part of an LWD tool suite of the type disclosed in P. Breton et al., "Well Positioned Seismic Measurements," Oilfield Review, pp. 32-45, Spring 2002, incorporated herein by reference. The bottomhole assembly 100 may also include measuring-while-drilling (MWD) modules (one of which is designated by reference numeral 130), and a rotary-steerable system or mud motor 150. The MWD module 130 may measure the azimuth and inclination of the drill bit 105 to, for example, monitor the borehole trajectory.

The bottomhole assembly 100 includes capabilities for measuring, processing and/or storing information, as well as for communicating information via, for example, a transmitter 122 and/or receivers 132A-B. The transmitter 122 is shown within the LWD module 120. However, the transmitted 122 may be included within the MWD module 130 and/or within a separate sonic and/or seismic imaging tool. Additionally, the receivers 132A-B are shown within the MWD module 130. However, the receivers 132A-B may be included within the LWD module 120 and/or within a separate sonic and/or seismic imaging tool. The transmitter 122 and/or the receivers 132A-B may be communicatively coupled to the communications relay 45 and/or the logging and control processor 50. Furthermore, although the single transmitter 122 is shown, other examples may include two or more transmitters. Additionally, although only the two receivers 132A-B are shown, other examples may include more or fewer receivers.

The transmitter 122 may be capable of transmitting any signal including, but not limited to, acoustic signals, seismic signals, sonic signals, ultrasonic signals, and/or any other compression and/or shear signals. The receivers 132A-B may include sensors that are capable of receiving the signal type generated by the transmitter. For example, if the transmitter 122 generates a seismic or acoustic signal with a center frequency of 8 kHz, sensors within the receivers 132A-B may be configured to detect the seismic signal with a 8 kHz center frequency while filtering other signals types. The transmitter 122 may include any type of device capable of generating a signal, while the receivers 132A-B include sensors that are configured to detect and transduce a signal into electrical data for processing by the logging and control processor 50.

Although the components of FIG. 3 are shown and described as being implemented in a particular conveyance type, the example methods and apparatus described herein are not limited to a particular conveyance type but, instead, may be implemented in connection with different conveyance types including, for example, coiled tubing, wireline, wired drill pipe, and/or any other conveyance types known in the industry. Additionally or alternatively, the examples described herein may be implemented with smart wells and/or intelligent completions.

Figure 4:
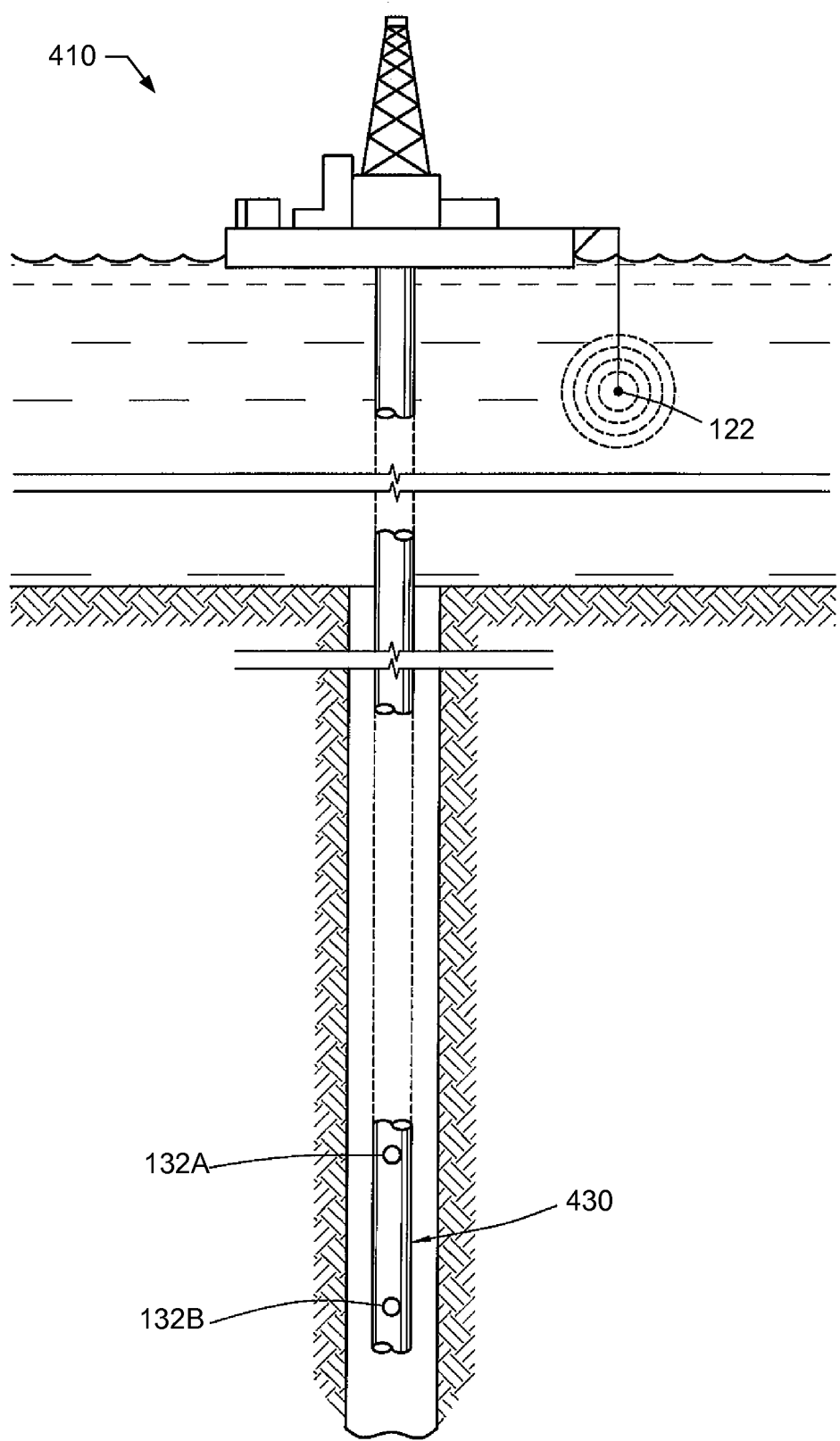
FIG. 4 shows an example sonic logging-while-drilling tool.

FIG. 4 shows an example offshore rig 410 that includes a logging-while-drilling (LWD) tool 430. The offshore rig 410 includes the transmitter 122 of FIG. 3 deployed near the surface of the water. Alternatively, the transmitter 122 may be deployed within the LWD tool 430. Additionally, the offshore rig 410 may include a processor to control the transmission of signals from the transmitter 122. The offshore rig 410 may also include acoustic receivers and/or a recorder to capture reference signals near the transmitter 122. Furthermore, the offshore rig 410 may include telemetry equipment for receiving signals from the transmitter 122 and/or the receivers 132A-B within the LWD 430.

The telemetry equipment and/or the recorder may be coupled to a processor so that transmitted and received signals may be synchronized using uphole and downhole clocks. The example LWD tool 430 may be similar to the LWD modules 120 and/or 120A of FIG. 3 described in U.S. Pat. No. 6,308,137, incorporated herein by reference. The LWD tool 430 includes at least the receivers 132A-B, which may be communicatively coupled to a signal processor so that recordings may be made of signals detected by the by the receivers 132A-B in synchronization with the transmitting of the signals by the transmitter 122.

FIG. 5 shows an example seismic imaging tool 502 within a subterranean formation 500 having a first rock layer 504 and a second rock layer 506 forming a boundary 507 with the first rock layer 504. The example seismic imaging tool 502 is located inline within a borehole 508 and is positioned parallel to the boundary of the first rock layer 504 to be imaged. The seismic imaging tool 502 may be used to image a shape and/or the boundary of the first rock layer 504 such as where the first rock layer 504 meets the second rock layer 506 at the boundary 507. Additionally, it should be recognized that the seismic imaging tool 502 may not be shown to scale in relation to the borehole 508 and/or the rock layers 504 and 506.

The example of FIG. 5 includes the two adjacent rock layers 504 and 506 that may include any types of subterranean rock. Furthermore, the rock layers 504 and 506 may include the same general rock type but the first rock layer 504 may include a rock type with a first type of directionally aligned sediment while the second rock layer 506 includes sediment aligned in a different direction. Alternatively, the rock layers 504 and 506 may include similar types of rocks with different directions of stress and/or fracturing.

The seismic imaging tool 502 may be included within the bottomhole assembly 100 of FIG. 3 or, alternatively, may be a separate imaging tool. A control device (not shown) may be structurally coupled to the seismic imaging tool 502 to position and/or move the tool 502 within the borehole 508. Additionally, the seismic imaging tool 502 may be communicatively coupled to the logging and control processor 50 of FIG. 3.

The example seismic imaging tool 502 includes transmitters 122A-B, which are similar or identical to the transmitter 122 of FIG. 3. Furthermore, the seismic imaging tool 502 includes receivers 132A-D that are similar or identical to the receivers 132A-B of FIG. 3. The transmitters 122A-B are positioned some distance away from the receivers 132A-D. Additionally, each of the receivers 132A-D is spaced apart from the other receivers 132A-D. Moreover, each of the receivers 132A-D may include one or more sensors circumferentially positioned around the exterior of the receiver. For example, if the seismic imaging tool 502 is cylindrical in shape, a receiver with eight sensors may have sensors positioned every 45 degrees around the circumference of the receiver. Likewise, if the seismic imaging tool is rectangular in shape, two sensors may be positioned on each side of the receiver.

The example of FIG. 5 shows the transmitter 122A transmitting a signal 510 through the first rock layer 504. The signal 510 is depicted as three wave fronts. The signal 510 may include any type of transmittable signal including an acoustic signal, a seismic signal, a sonic signal, an ultrasonic signal, and/or any other suitable signal. The frequency, amplitude, and/or power may be specified such that the signal 510 propagates through the first rock layer 504 and reflects off the boundary 507 between the first rock layer 504 and the second rock layer 506.

The example signal 510 is transmitted by the transmitter 122A as a wave in all directions (i.e., omnidirectionally). Thus, as each portion of the signal propagates through the rock layer 504 and reflects off the boundary 507 with the second rock layer 506, the receivers 132A-D receive respective reflected portions of the signal 510. In this manner, the receivers 132A-D may each receive a reflected portion of the transmitted signal 510. FIG. 5 shows the signal 510 affected by anisotropy within the first rock layer 504. For example, the signal 510 is shown as propagating faster in the inline direction (e.g., $V_{INL}$) compared to the signal 510 propagating in the orthogonal direction (e.g., $V_{ORT}$). In other examples, the signal 510 may propagate through the first rock layer 504 faster in the orthogonal direction than the inline direction.

FIG. 6 shows the seismic imaging tool 502 transmitting and receiving signals affected by anisotropy within the first rock layer 504 of FIG. 5. In FIG. 6, the first rock layer 504 is transparent for clarity of explanation. The subterranean rock formation 500 of FIG. 6 includes the seismic imaging tool 502 with the transmitters 122A-B and the receivers 132A-D of FIG. 5. Additionally, the example signal 510 of FIG. 5 is shown in FIG. 6 as signal paths 602-608.

The signal paths 602-608 originate at the transmitter 122A. The first signal path 602 is received by the first receiver 132A and is reflected by the boundary 507 at a first reflection point 612 at a reflection angle 610. The second signal path 604 is received by the second receiver 132B and is reflected by the boundary 507 of the first rock layer 504 at a second reflection point 614. Similarly, the third signal path 606 is received by the third receiver 132C and is reflected by the boundary 507 of the first rock layer 504 at a third reflection point 616. Additionally, the fourth signal path 608 is received by the fourth receiver 132D and is reflected by the boundary 507 of the first rock layer 504 at a fourth reflection point 618. Furthermore, the transmission angles with respect to an axis orthogonal to the boundary 507 of each of the signal paths 602-608 through the first rock layer 504 are the same as the reflection angles (e.g., the reflection angle 610) at the respective reflection points 612-618.

Because the distance from the reflection points 612-618 to the respective receivers 132A-D is relatively short, the boundary 507 of the first rock layer 504 may be modeled as a flat or planar surface at a constant distance from the tool 502 despite the fact that rock layer boundaries are typically at least somewhat uneven. The small signal reception area of the receivers 132A-D receives only a small portion of the signal 510 that is reflected from a small scale reflection point at the boundary 507. For example, the small scale reflection point may only be a few decimeters (dm) from the tool 502. At this small scale, a reflection point (e.g., each of the reflection points 612-618) may be modeled as a substantially flat or planar surface. In examples where the first rock layer boundary 507 is slanted, curved, or otherwise defined as a surface that is not at a substantially constant distance from the tool 502, seismic image processing may still model the small scale nature of the portion of the boundary as a flat or planar surface. Then, signal migration of multiple seismic images from different portions of the boundary 507 may be used to combine the calculated distances from the tool 502 to the boundary into a smooth continuous boundary to compensate for the localized flat surfaces provided by the seismic imaging processing.

The reflection points 612-618 are generally mid-points of the respective signal paths 602-608. Additionally, the distance between the transmitters 122A-B and the receivers 132A-D is known based on specifications of the seismic imaging tool 502. As a result of the known distances, a distance 620 between the tool 502 and the boundary 507 of the first rock layer 504 can be calculated based on the time required for each of the signal paths 602-608 to propagate from the first transmitter 122A to the respective receivers 132A-D. Additionally, an inline velocity can be calculated when an inline portion of the signal 510 is received by any one of the receivers 132A-D. This inline portion of the signal 510 propagates directly within the first rock layer 504 from the transmitter 122A in a direction parallel to (i.e., along the longitudinal axis of) the seismic imagining tool 502 to the receivers 132A-D.

The signal velocity associated with each of the signal paths 602-608 is affected by the anisotropy within the first rock layer 504. In the example of FIG. 6, signal portions traveling at an angle that is closer to in the inline direction propagate faster due to the anisotropy. For example, the portion of the signal 510 associated with the signal path 608 may have a greater velocity than portions of the signal 510 associated with the signal paths 602-606. Similarly, the signal portion associated with the signal path 606 may have a greater velocity than the signal portions associated with the signal paths 602-604. As a result of the signal portions having different velocities, the propagation time periods for each of the signal portions along the respective signal paths 602-608 are based not only on the distance traveled by the signal portions along the signal paths 602-608 but also on the anisotropic velocity of each of the signal portions.

In calculating the distance 620, the effect of anisotropy in the first rock layer 504 can be compensated by relating the anisotropic signal velocity of each of the signal paths 602-608, the angles of reflection for each signal paths 602-608, the known distances between the transmitters 122A-B and the receivers 132A-D, the inline signal velocity, and the time period or the transmission time for each of the signal paths 602-608. In addition to the signal paths 602-608 shown in FIG. 6, additional signal paths may be associated with each of the sensors positioned around the receivers 132A-D. Furthermore, the second transmitter 122B may transmit a second signal to be received by each of the receivers 132A-D. Still further, the example in FIG. 6 may include additional receivers and/or transmitters (not shown).

The logging and control processor 50 of FIG. 3 may compile the collected transmission time periods for each of the signal paths 602-608 as well as the transmission time periods for any other signal paths not shown. The logging and control processor 50 may then model the combined data into a best-fit model (e.g., a linear programming model) that determines the distance 620. Additionally, the model may determine a distance from each of the transmitters 122A-B and/or receivers 132A-D to the boundary 507 of the first rock layer 504.

Furthermore, signal migration may be implemented to determine the distance of the boundary of the first rock layer 504 from the tool 502 at the reflection points 612-618 and any other reflection points not shown. These distances may then be modeled to generate an image of a portion of the boundary 507 of the first rock layer 504. Upon imaging this portion of the first rock layer boundary 504, the seismic imaging tool 502 may be moved a distance (e.g., 6 inches) to determine a distance to the next portion of the first rock layer boundary 504.

Figure 7:
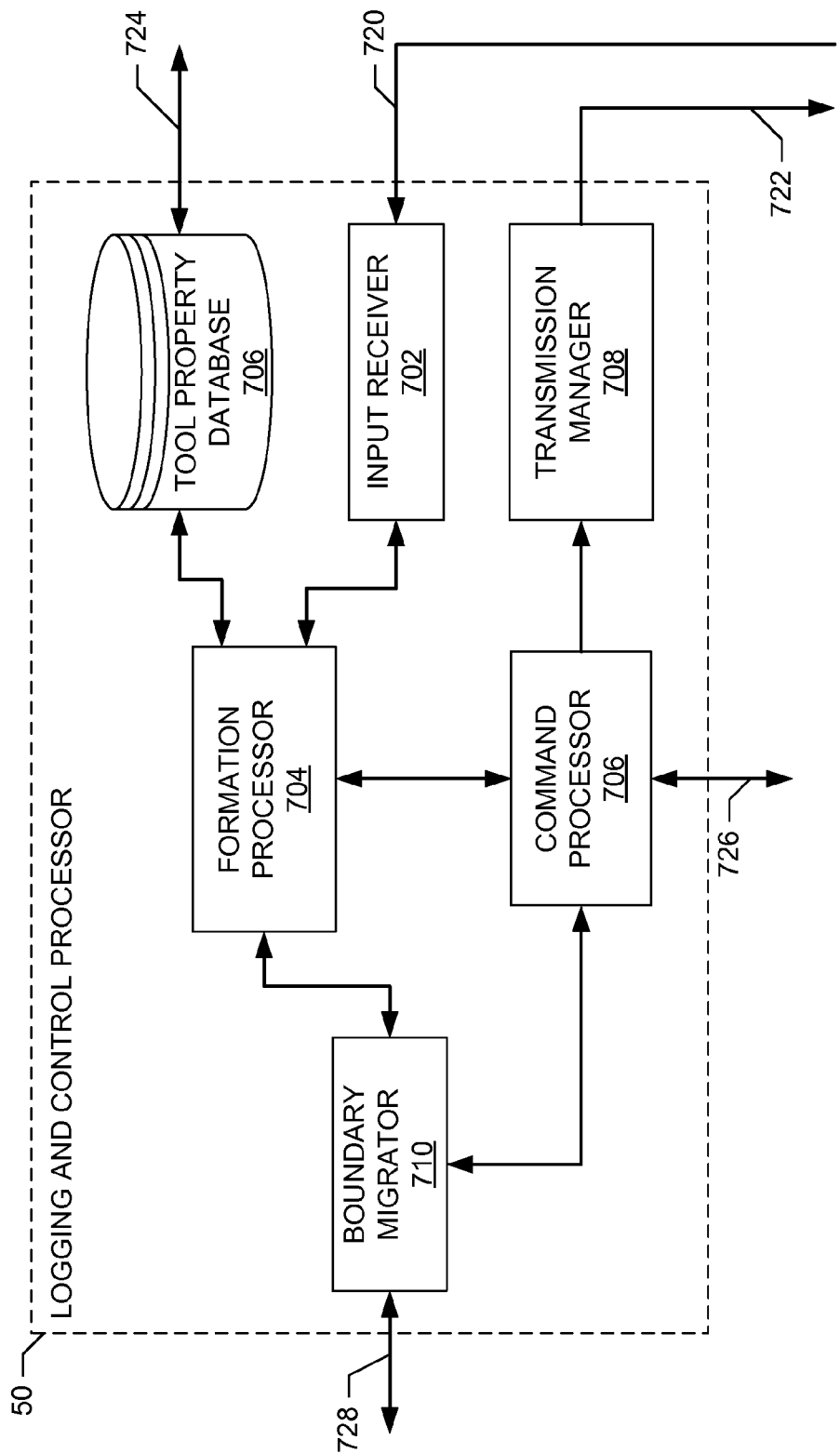
FIG. 7 shows an example functional block diagram of the logging and control processor of FIG. 3.

FIG. 7 shows an example functional diagram of the logging and control processor 50 of FIG. 3. The example logging and control processor 50 sends transmission instructions to a tool (e.g., the example tool 502, the LWD modules 120 and 120A, and/or the MWD module 130) and processes received signals and/or messages from the tool to calculate a distance from the tool to a portion of a rock layer boundary using anisotropic compensation of the signal velocity. Additionally, the logging and control processor 50 may use signal migration and/or semblance processing of multiple portions of calculated boundary positions to image and/or determine a continuous rock layer boundary.

To receive signals and/or messages from sensors and/or receivers within the tool, the example logging and control processor 50 includes an input receiver 702. The example input receiver 702 receives the signals and/or messages via a communication path 720 that may be communicatively coupled to the tool that includes the transmitters, receivers, and/or sensors. The communication path 720 may include any wired communication path(s) and/or any wireless communication path(s).

The input receiver 702 may receive the signals and/or messages by polling each of the receivers and/or sensors for any received signal data that may have been accumulated or collected by the receivers and/or sensors. Alternatively, the input receiver 702 may receive the signals and/or messages or, generally, information or data from the sensors and/or the receivers upon those sensors and/or receivers detecting a signal portion (e.g., a portion of the signal 510 of FIG. 5). Upon receiving the signals and/or messages, the example input receiver 702 may queue the information or data associated with the signals and/or messages until a formation processor 704 is available to process the information. Alternatively, the input receiver 702 may parse the received messages for information included within the message including the identity of the receiver and/or sensor that detected the signal portion and transmitted the message, the time a signal was detected and/or any other data included within the signal that was detected. Upon parsing this information, the input receiver 702 may forward the parsed information to the formation processor 704 for processing. In yet another example, the input processor 702 may buffer the received messages until the input processor 702 receives a request for data from the formation processor 704. Upon receiving the request, the input receiver 702 may forward the data or information included within the received signals and/or messages and/or the received messages to the formation processor 704.

To calculate a distance of a subterranean rock layer boundary from a tool by compensating for anisotropy within the rock layer, the example logging and control processor 50 of FIG. 7 includes the formation processor 704. The example formation processor 704 receives messages and/or data included within the received signals and/or messages from the input receiver 702. The example formation processor 704 then matches those messages and/or data with the data associated with the transmission of the corresponding signal. The data associated with transmitting the signal may include a time the signal was transmitted from a transmitter (e.g., a timestamp), the signal type, and/or any other data included within the signal.

By matching the received messages to the transmitted signals and/or message data, the formation processor 704 can calculate the inline velocity of the signal and determine the time period elapsed for each signal portion to propagate from the transmitter to the corresponding sensor and/or receiver. The formation processor 704 calculates the propagation time by subtracting the time at which a portion of the signal was received by a sensor and/or receiver from the time at which the signal was transmitted. Additionally, the example formation processor 704 may calculate the inline signal velocity by determining a first instance or occurrence for a received signal and/or message from a receiver, calculating the time period for the signal to propagate from the transmitter to the receiver and/or sensor, and dividing the distance between the transmitter and the receiver by the time period. Further, the example formation processor 704 may calculate the inline signal velocity by using semblance analysis of the signal traveling along receivers within the seismic and/or sonic tool.

The first instance of the received signal and/or message is generally a portion of the signal traveling in the direction along the tool (i.e., inline) because this is the shortest distance for the signal to travel. Subsequent instances or occurrences of the receiver receiving portions of the signal are generally from reflections off the rock layer boundary 507 because the distance to the rock layer boundary 507 and back to the tool is greater than the distance directly from the transmitter to the receiver.

The example formation processor 704 may determine distances between each transmitter and receiver and/or sensor by accessing a tool property database 706. For example, if the formation processor 704 processes a received signal or message that indicates the signal portion was received by a sensor with an identification value of DM01, the formation processor 704 may access the database 706 to determine that the sensor DM01 has a location that is two meters from the transmitter.

Upon calculating the time periods, the example formation processor 704 may generate an equation (e.g., using Equations 1 and/or 2 above), a mathematical relationship, and/or the time-distance anisotropic velocity relationships for each receiver and/or sensor that relates a distance to a portion of a rock layer boundary to a propagation time of the signal, a distance of the receiver from the transmitter, the inline velocity of the signal, and/or the anisotropic velocity of the signal portion received.

Additionally, the formation processor 704 may determine an orthogonal signal velocity based on a distance to a portion of a rock layer boundary, a propagation time of the signal, a distance of the receiver from the transmitter, and/or the inline velocity of the signal. The formation processor 704 may then combine the equations into an expression and/or data model (e.g., a system or matrix of equations) to determine the anisotropic velocity of each signal portion and/or a distance to a portion of the rock layer boundary. The anisotropic velocity of each signal portion may be expressed as a ratio of the inline velocity and an angle of propagation and/or reflection of the signal portion through the rock layer (e.g., using Equation 2 above).

The example formation processor 704 may determine that additional data is needed to calculate a distance to a boundary. In these cases, the formation processor 704 may send a message to a command processor 706 to instruct a transmitter to transmit another signal. Upon receiving this message, the command processor 706 may instruct a transmission manager 708 to instruct a transmitter to transmit a signal. The instructions may include a time to transmit the signal and/or a signal type (e.g., signal frequency, signal amplitude, signal duration, etc.).

The formation processor 704 may utilize a plurality of equations to determine the angle of propagation for each signal portion to determine the anisotropic velocity and the distance to a portion of the rock layer boundary. Because the angle of propagation is dependent on the distance to the boundary 507 (FIG. 5), the formation processor 704 may utilize any best fit model, least squares best fit model, a variance minimization best fit model, and/or any other best fit model. Alternatively, the formation processor 704 may organize the equations into a matrix or system of equations to model and/or determine the distance to the rock layer boundary. Furthermore, because the points of reflection of the signal portions are some distance apart, the formation processor 704 may determine a distance from each point of reflection at the boundary 507 to an orthogonal point in the tool.

Upon calculating the distance(s) from the tool to the portion of the rock layer boundary being imaged or measured, the formation processor 704 forwards these distance(s) to a boundary migrator 710. The example boundary migrator 710 determines distances between the calculated distances between the tool and the rock layer boundary 507 to generate a continuous rock layer boundary for imaging. For example, if the boundary migrator 710 receives the distance to reflection points 612 and 614 of FIG. 6 from the formation processor 704, the boundary migrator 710 determines the distances from between the points 612 and 614 to the tool 502. The example boundary migrator 710 determines these distances using migration processing that estimates the distances to the boundary 507 between the points 612 and 614 based on the measured or calculated distances associated with the points 612-618.

Additionally, the example boundary migrator 710 of FIG. 7 may store the calculated distances to a database. Then, as the tool moves within the borehole to determine distances to (i.e., to image) other portions of the boundary, the boundary migrator 710 migrates (e.g., interpolates) the distances to the rock layer boundary between the measurement locations of the tool. For example, if there is a seven foot spacing between measurement locations of the tool, the boundary migrator 710 may estimate the rock layer boundary between these points based on the calculated distances. As a result of the migration processing, the boundary migrator 710 generates a continuous subterranean rock layer boundary for portions of the rock layer that have been measured.

The example boundary migrator 710 may also create images from the calculated and/or estimated distances of the rock layer boundary. These images may show the rock layer shape, depth, boundary and/or any other information that may be determined from the calculated distances. The example boundary migrator 710 may transmit the images, the calculated distances and/or the estimated distances to an operator via a communication path 728.

The example logging and control processor 50 includes the command processor 706 to manage the activities and/or functions of the formation processor 704, the boundary migrator 710, and/or the transmission manager 708. The command processor 706 may receive commands from an oil and/or gas producer operator via a communication path 726. The operator may send instructions to the command processor 706 to initiate imaging of a rock layer boundary, to initiate image processing of a rock layer boundary, and/or to determine an operating efficiency of the formation processor 704. Additionally, an operator may transmit an image profile to the example command processor 706 to specify locations within a borehole that a tool is to image and/or measure. The command processor 706 may then manage the timing of the transmission of signals and the processing of the received data via the formation processor 704 to ensure a rock layer is measured and/or imaged according to the image profile. Additionally, the command processor 706 may instruct the movement of the tool.

To manage the generation and transmission of commands to transmitters, sensors, and/or receivers included within the tool, the example logging and control processor 50 of FIG. 7 includes the transmission manager 708. Upon receiving an instruction to transmit a signal, the transmission manager 708 determines which transmitter is to transmit the signal, a time at which the signal is to be transmitted, the type of signal to be transmitted, and/or any signal properties of the signal to be transmitted. The example transmission manager 708 then sends a transmission message to the corresponding transmitter included within the tool via a communication path 722. The communication path 722 may include any wired and/or wireless communication path(s).

The transmission message may include the signal type the transmitter is to transmit, a duration for the transmission of the signal (e.g., 1 second), a time at which the signal is to be transmitted, and/or signal properties (e.g., amplitude, frequency, etc.). Alternatively, the transmission manager 708 may send a transmission message to the appropriate transmitter at the time the transmitter is to transmit a signal. Upon receiving the message, the transmitter may then transmit the specified signal. Additionally, the transmission manager 708 may send a transmission message to the receivers and/or sensors to alert the receivers and/or sensors that a signal will be transmitted. This alert may activate the sensors and/or receivers and/or may provide to the sensors and/or receivers the time at which the signal will be transmitted.

The example tool property database 706 stores known properties of the tool, including distances between transmitters, receivers and/or sensors and/or locations of the sensors around a circumference of the tool. The database 706 may also store the angle of orientation for each of the sensors and/or the signal type(s) that the transmitters are configured to output. Furthermore, the database 706 may store identification information for each of the transmitters, receivers, and/or sensors. The data within the database 706 may be updated, added to, deleted, and/or modified by an operator via a communication path 724. For example, an operator may modify distances between receives and transmitters after a redesign of the tool. The tool property database 706 may be implemented by random access memory (RAM), read-only memory (ROM), a programmable ROM (PROM), an electronically-programmable ROM (EPROM), an electronically-erasable PROM (EEPROM), and/or any other type of memory.

While an example manner of implementing the logging and control processor 50 is depicted in FIG. 7, one or more of the interfaces, data structures, elements, processes and/or devices illustrated in FIG. 7 may be combined, divided, rearranged, omitted, eliminated and/or implemented in any other way. For example, the example input receiver 702, the example formation processor 704, the example command processor 706, the example transmission manager 708, and/or the example boundary migrator 710 illustrated in FIG. 7 may be implemented separately and/or in any combination using, for example, machine-accessible or readable instructions executed by one or more computing devices and/or computing platforms (e.g., the example computing system 1100 of FIG. 11).

Further, the example input receiver 702, the example formation processor 704, the example command processor 706, the example transmission manager 708, the example boundary migrator 710 and/or, more generally, the example logging and control processor 50 may be implemented by hardware, software, firmware and/or any combination of hardware, software and/or firmware. Thus, for example, any of the example input receiver 702, the example formation processor 704, the example command processor 706, the example transmission manager 708, the example boundary migrator 710 and/or, more generally, the example logging and control processor 50 can be implemented by one or more circuit(s), programmable processor(s), application specific integrated circuit(s) (ASIC(s)), programmable logic device(s) (PLD(s)) and/or field programmable logic device(s) (FPLD(s)), etc.

Figure 8:
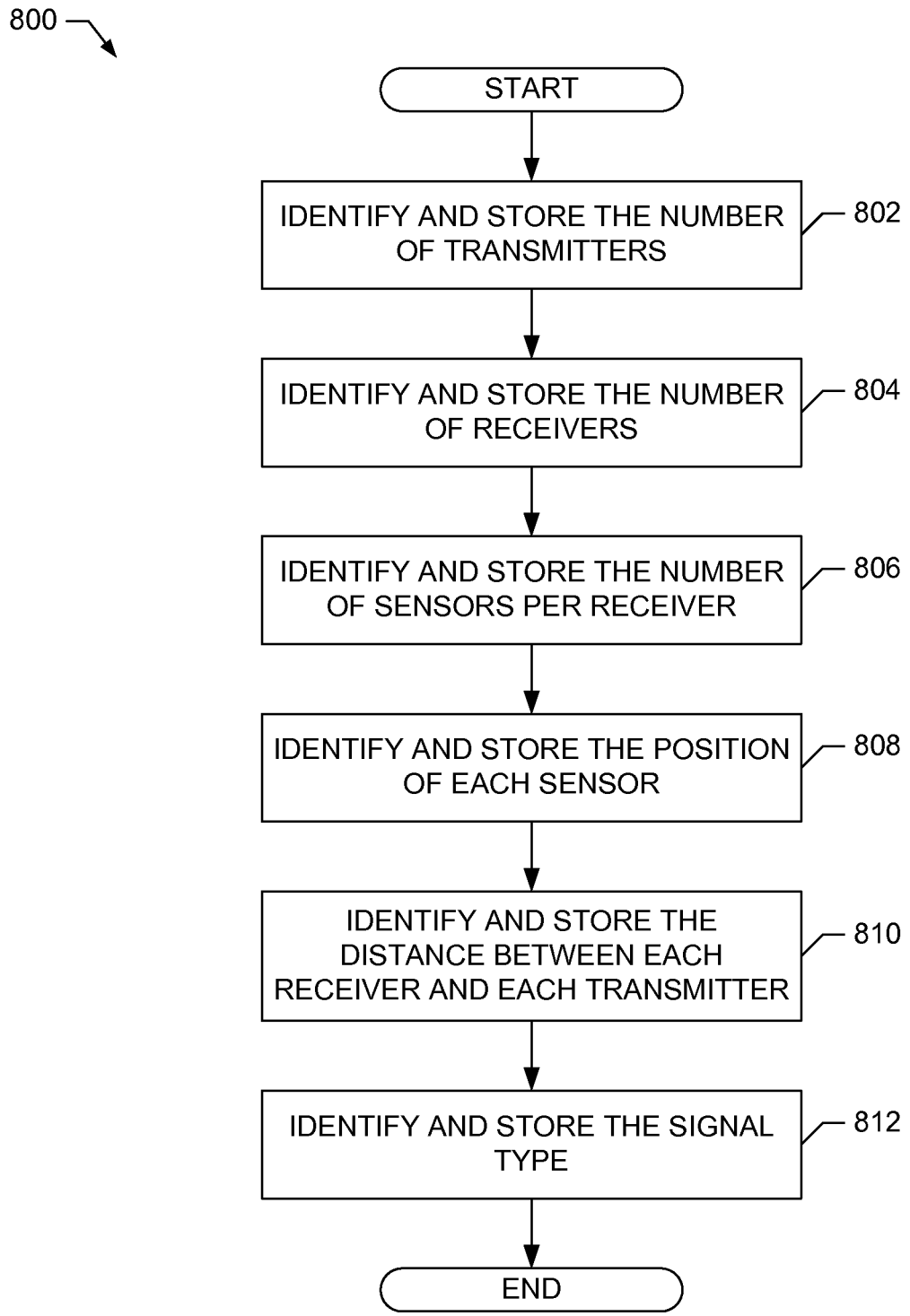
FIGS. 8, 9 and 10 are flowcharts of example processes that may be used to implement the example logging and control processor, the transmitters, the receivers, the example formation processor, the example boundary migrator, command processor, and/or the transmission manager of FIGS. 3, 5, 6, and 7.
Figure 9:
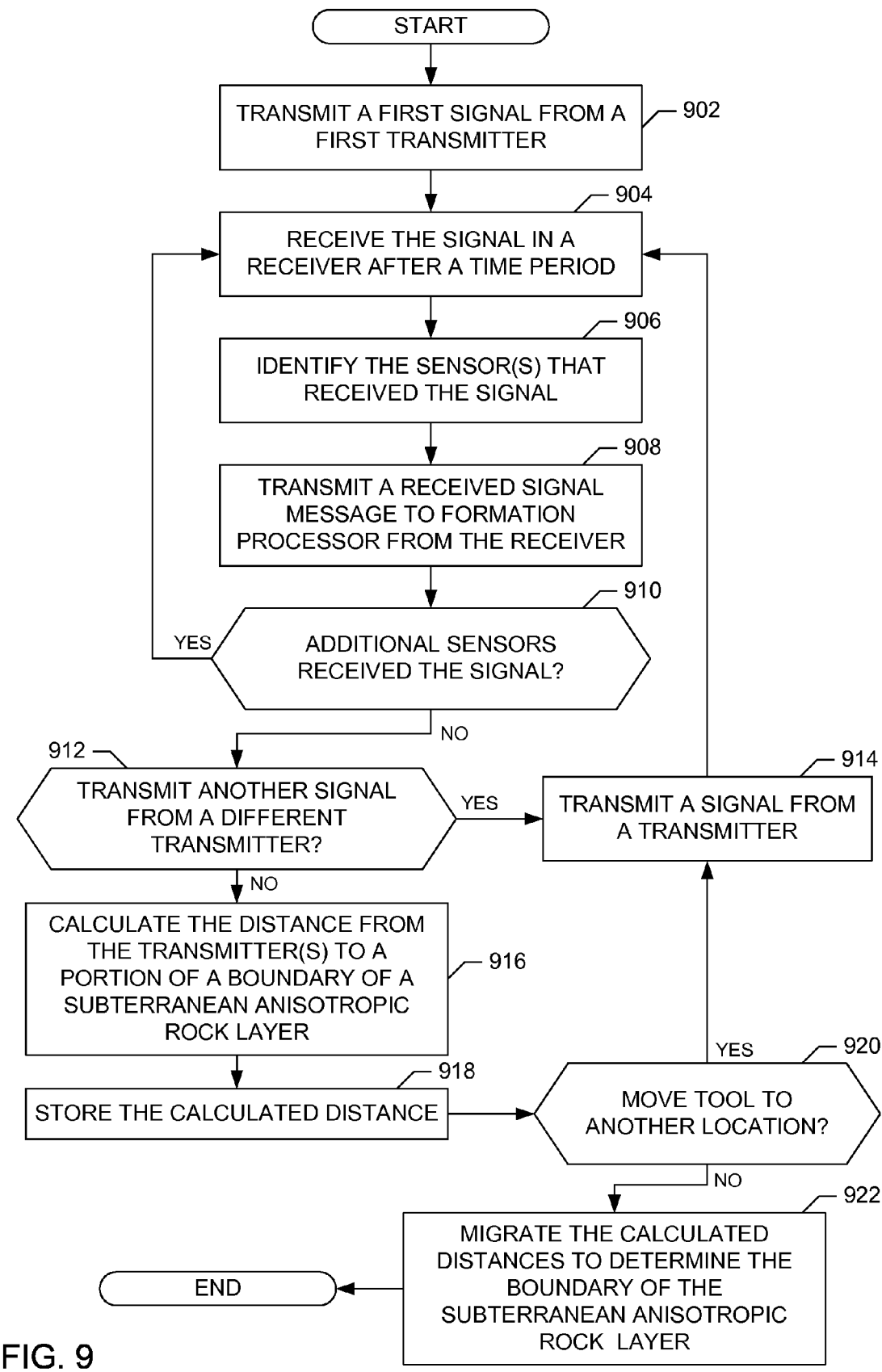
Figure 10:
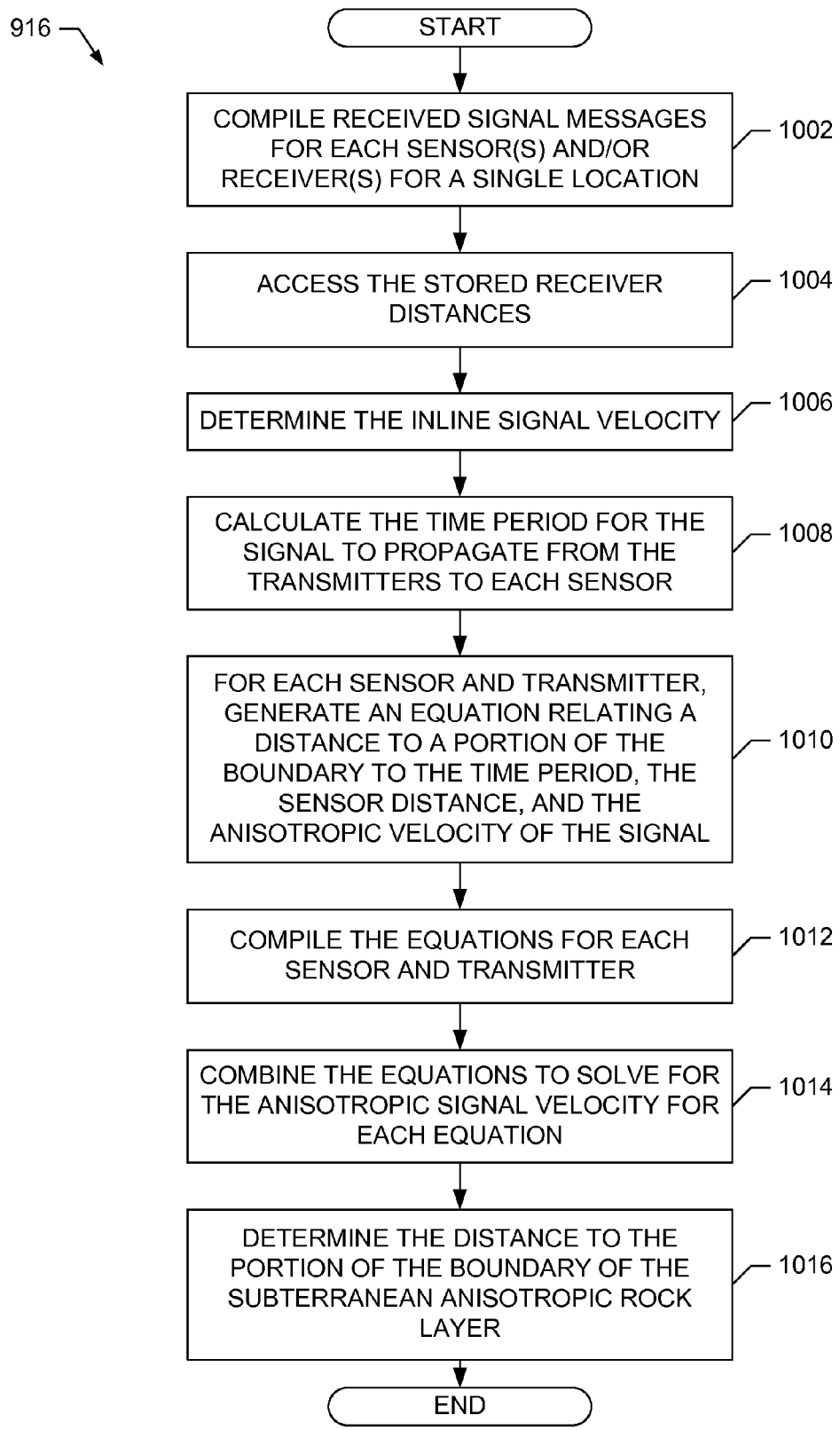

FIGS. 8, 9, and 10 are flowcharts depicting example processes that may be carried out to implement the example logging and control processor 50, the example seismic imaging tool 502, the example transmitters 122A-B, the example receivers 132A-D, the example formation processor 704, the example boundary migrator 710, the example command processor 706, and/or the transmission manager 708 of FIGS. 3, 5, 6, and/or 7. The example processes of FIGS. 8, 9, and/or 10 may be carried out by a processor, a controller and/or any other suitable processing device. For example, the example processes of FIGS. 8, 9, and/or 10 may be embodied in coded instructions stored on any tangible computer-readable medium such as a flash memory, a CD, a DVD, a floppy disk, a ROM, a RAM, a programmable ROM (PROM), an electronically-programmable ROM (EPROM), an electronically-erasable PROM (EEPROM), an optical storage disk, an optical storage device, magnetic storage disk, a magnetic storage device, and/or any other medium that can be used to carry or store program code and/or instructions in the form of methods, processes or data structures, and which can be accessed by a processor, a general-purpose or special-purpose computer, or other machine with a processor (e.g., the example computing system 1100 discussed below in connection with FIG. 11). Combinations of the above are also included within the scope of computer-readable media.

Processes comprise, for example, instructions and/or data that cause a processor, a general-purpose computer, special-purpose computer, or a special-purpose processing machine to implement one or more particular processes. Alternatively, some or all of the example operations of FIGS. 8, 9, and/or 10 may be implemented using any combination(s) of ASIC(s), PLD(s), FPLD(s), discrete logic, hardware, firmware, etc.

Also, one or more of the example operations of FIGS. 8, 9, and/or 10 may be implemented using manual operations or as any combination of any of the foregoing techniques, for example, any combination of firmware, software, discrete logic and/or hardware. Further, other processes implementing the example operations of FIGS. 8, 9, and/or 10 may be employed. For example, the order of execution of the blocks may be changed, and/or one or more of the blocks described may be changed, eliminated, sub-divided, or combined. Additionally, any or all of the example operations of FIGS. 8, 9, and/or 10 may be carried out sequentially and/or carried out in parallel by, for example, separate processing threads, processors, devices, discrete logic, circuits, etc.

The example process 800 of FIG. 8 determines known parameters associated with transmitters and/or receivers included within a seismic imaging tool (e.g., the seismic imaging tool 502), a LWD module, a MWD module, and/or any other type of measuring device that includes transmitters and/or receivers. By determining the known parameters including the number of transmitters, receivers, and/or sensors, these known parameters associated with a tool may be accessed by the example formation processor 704 of FIG. 7 to calculate and/or model a distance of the tool from a rock layer boundary using anisotropy compensation. The example process 800 may be executed upon the setup and/or prior to lowering the seismic imaging tool, LWD module, and/or MWD module into a borehole. Additionally, the example process 800 may be carried out upon the specification and/or design of the seismic imaging tool, LWD module, and/or MWD module.

The example process 800 begins by identifying and storing the number of transmitters included within the seismic imaging tool, LWD module, and/or MWD module (block 802). Next, the example process 800 identifies and stores the number of receivers within the seismic imaging tool, LWD module, and/or MWD module (block 804). The example process 800 then identifies and stores the number of sensors per receiver and the position of each sensor on the respective receivers (blocks 806 and 808). The position of a sensor may be identified by indicating on which side of a tool the sensor is located and/or whether the sensor is directionally positioned to receive signals from downhole, uphole, orthogonal to the tool, or at an angle to the tool.

The example process 800 continues by identifying and storing a distance between each transmitter and each receiver (block 810). The distances may be calculated from the closet point of the transmitter to a closest point on the receiver or a midpoint of the transmitter to a midpoint of the receiver. Alternatively, the example process 800 may include calculating a distance from each transmitter to each sensor within each receiver. The example process 800 then identifies and stores the signal type to be emitted by the transmitter(s) (block 812). The signal type may include a frequency of the signal, an amplitude of the signal, and/or any other signal properties. Alternatively, the command processor 706 of FIG. 7 may select a signal type to transmit if the transmitters are capable of transmitting more than one type of signal. Upon selecting a signal type to transmit, the command processor 706 may transmit the signal type to the formation processor 704 to calculate and model a distance to a rock layer boundary. The number of transmitters, receivers, sensors per receiver, distance and/or signal type identified by the example process 800 may be stored to the tool property database 706 of FIG. 7. Additionally, identifying the sensors, transmitters and/or receivers may include storing a unique identification value associated with each device. An identification value may be included within any message transmitted by the transmitters, the receivers, and/or the sensors. Upon identifying the signal type, the example process 800 ends.

The example process 900 of FIG. 9 determines a distance between a tool and a rock layer boundary by compensating for anisotropy within the rock layer. Multiple example processes 900 may be executed in parallel or series as multiple signals are transmitted by transmitter(s) within a tool. Additionally, multiple example processes 900 may be executed in parallel or series as multiple signals are transmitted by transmitter(s) within other tools communicatively coupled to a common processor (e.g., the example logging and control processor 50 of FIG. 7).

The example process 900 begins by transmitting a first signal from a first transmitter within a seismic imaging tool, LWD module, and/or MWD module (block 902). The first signal is transmitted through a subterranean rock layer. A portion of the first signal may reflect off a boundary of the subterranean rock layer back to one or more receivers. Additionally, another portion of the first signal may travel inline with the tool and be received by one or more receivers to determine an inline velocity of the first signal. After a time period, the first signal is received by a receiver (block 904). The first signal may be received by one or more sensors within the receiver. Next, the receiver identifies the sensor(s) that received a portion of the first signal (block 906). The receiver may identify the sensors by a unique identification message transmitted from each sensor that received the first signal. Upon identifying the sensors, the receiver transmits a received signal message to the example formation processor 704 within the logging and control processor 50 of FIG. 7 (block 908). The received signal message may include a time the signal was received, an identification value of the sensor, an identification value of a receiver that received the signal, and/or any other data that may have been included within the signal (e.g., an identification value of the transmitter, a time the signal was transmitted, etc.). Alternatively, each of the sensors may transmit a received signal message including a unique identifier of the sensor to the logging and control processor 50.

The example process 900 continues by determining if any additional sensors within other receivers have also received the first signal (block 910). If one or more of the other sensors have received the first signal (blocks 910 and 904), those corresponding receivers identify the sensor(s) that received the signal (block 908). The example process 900 may determine if there are no other receivers to receive a signal if the logging and control processor 50 has received signal messages from all the receivers and/or if after a specified time period, the example process 900 determines that the signal did not reach a receiver and/or a receiver did not detect a portion of the first signal. This time period may be an estimation of the time for the first signal to propagate through the first rock layer to reach all of the receivers included within the tool. If no other receiver has received the signal, the example process 900 determines if another signal is to be transmitted from a transmitter (block 912).

If the example process 900 of FIG. 9 determines that another signal is to be transmitted (block 912), the example process 900 instructs a transmitter to transmit another signal (block 914). The transmitter that transmits the additional signal may include the transmitter that transmitted the first signal and/or a different transmitter. Upon transmitting another signal, the example process executes blocks 906-910 again. However, if the example process 900 of FIG. 9 determines that another signal is not to be transmitted (block 912), the example process 900 calculates a distance from the tool, the receiver(s), and/or the transmitter(s) to a portion of a boundary of the rock layer (block 916). The example process 916 in conjunction with FIG. 10 details the calculation of the distance including compensation for anisotropy within the rock layer.

Upon determining and/or modeling the distance to the boundary, the example process 900 stores the distance (block 918). This distance may be stored to the example boundary migrator 710 and/or any other database. Next, the example process 900 determines if the tool is to be moved to another location within the borehole (block 920). If the tool is to be moved to image another portion of the boundary of the rock layer, the tool is moved a specified distance and a signal is transmitted from a transmitter (block 914). The specified distance for the tool to be moved may range from a few centimeters to a few kilometers depending on the process type to image the complete boundary.

If the tool is not to be moved to another location (block 920), the example process 900 migrates the calculated distances to determine and/or model the boundary of the subterranean anisotropic rock layer (block 922). Migrating the calculated distances may include interpolating the unmeasured portions of the boundary between measured portions of the boundary to some average of the portions of the boundary with known calculated distances. Upon determining the boundary of the subterranean rock layer, the example process 900 ends.

FIG. 10 depicts an example manner of implementing the process 916 of FIG. 9. The example process 916 of FIG. 10 calculates and/or models a distance between a tool and a rock layer boundary by compensating for anisotropy within the rock layer. Multiple example processes 916 may be executed in parallel or series as multiple signals are transmitted by transmitter(s) within a tool. Additionally, multiple example processes 916 may be executed in parallel or series as multiple signals are transmitted by transmitter(s) within other tools communicatively coupled to a common processor (e.g., the example logging and control processor 50 of FIG. 7).

The example process 916 begins by compiling received signals and/or messages from each receiver and/or sensor for a single location of a tool within a borehole (block 1002). Each received signal and/or message may include a time the signal or message was received by a receiver and/or sensor, an identification value of the sensor and/or received that received the signal or message, and/or any other data that may have been included within the signal or message (e.g., identification value of the transmitter, time the signal was transmitted, etc.). Additionally, the example process 916 may match the received signal data to data associated with the corresponding transmitted signal.

Next, the example process 916 accesses the tool property database 706 of FIG. 7 to determine the stored distances between each of the transmitters, receivers and/or sensors (block 1004). The example process 916 then determines the inline signal velocity of the transmitted signal (block 1006). The inline signal velocity may be determined by identifying a time period corresponding to when one or more receivers and/or sensors detected a first instance of the transmitted signal. When a signal is transmitted, the first instance of the signal received by a sensor should be a portion of the signal propagating in the direction of the tool. Portions of the signal that are received at a later time period arrive later because those portions of the signal have a greater distance to travel by reflecting off a boundary and returning to the tool. Thus, the example process 916 may identify the first instance of the received signal, determine the time period from when the signal was transmitted to when the signal was received, and divide a distance between the transmitter and the receiver and/or sensor that received the signal by that time period to determine the inline signal velocity.

The example process 916 of FIG. 10 continues by calculating a time period for each portion of the received signal to propagate from the transmitters to each sensor and/or receiver (block 1008). Then, for each transmitter and each sensor and/or receiver, the example process 916 generates an equation relating a distance to a portion of a rock layer boundary to the calculated time period, the distance between the receiver and/or sensor with the transmitter, and/or an anisotropic velocity of the signal (block 1010). The anisotropic velocity of the portion of the signal received may be expressed as a ratio of the inline velocity similar to Equation 2 above.

The example process 916 then compiles the equations for each transmitter and receiver and/or sensor (block 1012). Next, the example process 916 combines the compiled equations to solve for the anisotropic signal velocity for each equation (block 1014). The example process 916 may combine the equations (e.g., equations similar to Equation 1) into a matrix where the anisotropic velocity of each signal portion is the unknown variable. Alternatively, the anisotropic velocity of each signal portion may be determined by modeling the combined equations to determine a best fit solution. The example process 916 may then or concurrently determine the distance to the portion of the subterranean anisotropic rock layer boundary (block 1016). Upon determining the anisotropic velocity for each signal portion, the example process may determine the distance using an equation similar to Equation 1. Alternatively, the example process 916 may determine the distance to the boundary by solving for the distance in the same model that also determines the anisotropic signal velocity. In this manner, the best fit model solves for the distance while solving for the anisotropic velocity for each signal. Generally, the larger the number of equations, the more accurate the model may be to determine the anisotropic signal velocity and/or a distance to the boundary. For example, a tool with three transmitters, thirteen receivers, and eight sensors per receiver may yield 312 equations while one transmitter, two receivers, and two sensors per receiver may yield four equations. Upon determining the distance to a portion of the rock later boundary, the example process 916 ends.

Figure 11:
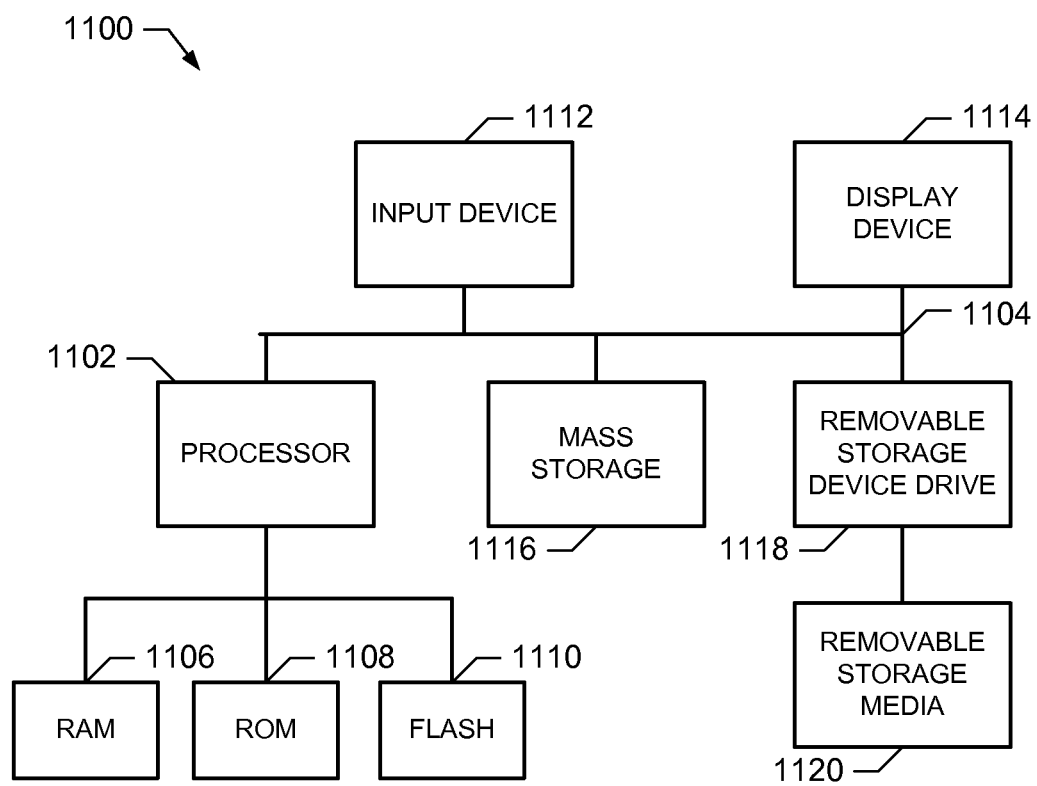
FIG. 11 is a block diagram of an example processor system that may be used to implement the example methods and apparatus described herein.

FIG. 11 is a block diagram of an example computing system 1100 that may be used to implement the example methods and apparatus described herein. For example, the computing system 1100 may be used to implement the example logging and control processor 50, the example formation processor 704, and/or the example boundary migrator 710. The example computing system 1100 may be, for example, a conventional desktop personal computer, a notebook computer, a workstation or any other computing device. A processor 1102 may be any type of processing unit, such as a microprocessor from the Intel® Pentium® family of microprocessors, the Intel® Itanium® family of microprocessors, the Intel® Core™ family of microprocesors, and/or the Intel XScale® family of processors. Memories 1106, 1108 and 1110 that are coupled to the processor 1102 may be any suitable memory devices and may be sized to fit the storage demands of the system 1100. In particular, the flash memory 1110 may be a non-volatile memory that is accessed and erased on a block-by-block basis.

An input device 1112 may be implemented using a keyboard, a mouse, a touch screen, a track pad or any other device that enables a user to provide information to the processor 1102.

A display device 1114 may be, for example, a liquid crystal display (LCD) monitor, a cathode ray tube (CRT) monitor or any other suitable device that acts as an interface between the processor 1102 and a user. The display device 1114 as pictured in FIG. 11 includes any additional hardware required to interface a display screen to the processor 1102.

A mass storage device 1116 may be, for example, a conventional hard drive or any other magnetic or optical media that is readable by the processor 1102.

A removable storage device drive 1118 may, for example, be an optical drive, such as a compact disk-recordable (CD-R) drive, a compact disk-rewritable (CD-RW) drive, a digital versatile disk (DVD) drive or any other optical drive. It may alternatively be, for example, a magnetic media drive. A removable storage media 1120 is complimentary to the removable storage device drive 1118, inasmuch as the media 1120 is selected to operate with the drive 1118. For example, if the removable storage device drive 1118 is an optical drive, the removable storage media 1120 may be a CD-R disk, a CD-RW disk, a DVD disk or any other suitable optical disk. On the other hand, if the removable storage device drive 1118 is a magnetic media device, the removable storage media 1120 may be, for example, a diskette or any other suitable magnetic storage media.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or systems described herein.

It should also be noted that the example software and/or firmware implementations described herein are stored on a tangible storage medium, such as: a magnetic medium (e.g., a magnetic disk or tape); a magneto-optical or optical medium such as an optical disk; or a solid state medium such as a memory card or other package that houses one or more read-only (non-volatile) memories, random access memories, or other re-writable (volatile) memories. Accordingly, the example software and/or firmware described herein can be stored on a tangible storage medium such as those described above or successor storage media.

Although certain example methods, apparatus, and machine-accessible medium have been described herein, the scope of coverage of this patent is not limited thereto. On the contrary, this patent covers all methods, apparatus, and machine-accessible medium fairly falling within the scope of the appended claims either literally or under the doctrine of equivalents.

What is claimed is:

1. A method comprising:
providing, in a borehole, a transmitter and a series of receivers spaced linearly from the transmitter at known different distances from the transmitter;
measuring linear propagation times for a signal to propagate linearly from the transmitter to each of the receivers;
determining an inline velocity based at least in part on the linear propagation times;
measuring reflection times for a signal to propagate from the transmitter to a boundary and from the boundary to each of the receivers;
for each of the reflection times, providing a time-distance anisotropic velocity (TDAV) relationship that depends on an effective signal velocity in an anisotropic subterranean formation adjacent the boundary as a function of reflection angle for the reflection time signal with respect to the boundary, inline velocity and orthogonal velocity, orthogonal to the inline velocity;
performing semblance processing to combine the time-distance anisotropic velocity (TDAV) relationships with the inline velocity to provide for a best-fit calculation of the effective signal velocities for the different reflection angles of the reflection time signals; and
based on the best-fit calculation, calculating for each of the effective anisotropic velocities a distance for the corresponding receiver to the boundary.

2. The method of claim 1 wherein the calculating comprises use of the following equation to calculate the distance (X):

$$T = \frac{\sqrt{(2X)^2 + a^2}}{V_\theta}$$

wherein T is a travel time, a is a known distance between the transmitter and one of the receivers, and $V_\Theta$ is an effective signal velocity as a function of reflection angle $\Theta$.

3. The method of claim 2 wherein the calculating comprises replacing the distance (X) with the distance multiplied by a cosine of an angle between the boundary and an axis of the borehole.

4. The method of claim 1 wherein the time-distance anisotropic velocity (TDAV) relationship comprises an approximately linear relationship for an effective signal velocity as a function of reflection angle.

5. The method of claim 1 wherein for each of the effective anisotropic velocities the distance for the corresponding receiver to the boundary is approximately equal to the distances for the other receivers.

6. The method of claim 1 wherein the measuring reflection times for a signal to propagate from the transmitter to a boundary and from the boundary to each of the receivers comprises measuring reflection times for the different reflection angles due to the transmitter and the series of receivers being spaced linearly from the transmitter at known different distances from the transmitter.

7. An apparatus to calculate distances from a borehole to a boundary of an anisotropic subterranean rock layer, the apparatus comprising:
   an input receiver to receive input from equipment in a borehole that comprises a transmitter and a series of receivers spaced linearly from the transmitter at known different distances from the transmitter; and
   a processor configured to
      determine an inline velocity based at least in part on received input for linear propagation times for a signal to propagate linearly from the transmitter to each of the receivers,
      receive input for reflection times for a signal to propagate from the transmitter to the boundary and from the boundary to each of the receivers,
      for each of the reflection times, provide a time-distance anisotropic velocity (TDAV) relationship that depends on an effective signal velocity in the anisotropic subterranean rock layer as a function of reflection angle for the reflection time signal with respect to the boundary, inline velocity and orthogonal velocity, orthogonal to the inline velocity,
      perform semblance processing to combine the time-distance anisotropic velocity (TDAV) relationships with the inline velocity to provide for a best-fit calculation of the effective signal velocities for the different reflection angles of the reflection time signals,
      based on the best-fit calculation, calculate for each of the effective anisotropic velocities a distance for the corresponding receiver to the boundary.

8. The apparatus of claim 7 wherein the processor is configured to calculate the distance (X) using the following equation:

$$T = \frac{\sqrt{(2X)^2 + a^2}}{V_\theta}$$

wherein T is a travel time, a is a known distance between the transmitter and one of the receivers, and $V_\Theta$ is an effective signal velocity as a function of reflection angle $\Theta$.

9. The apparatus of claim 8 wherein the processor is configured to replace the distance (X) with the distance multiplied by a cosine of an angle between the boundary and an axis of the borehole.

10. The apparatus of claim 7 wherein the time-distance anisotropic velocity (TDAV) relationship comprises an approximately linear relationship of an effective signal velocity as a function of reflection angle.

11. The apparatus of claim 7 wherein for each of the effective anisotropic velocities the distance for the corresponding receiver to the boundary is approximately equal to the distances for the other receivers.

12. The apparatus of claim 7 wherein the received input for reflection times for a signal to propagate from the transmitter to the boundary and from the boundary to each of the receivers comprises received input for reflection times for the different reflection angles due to the transmitter and the series of receivers being spaced linearly from the transmitter at known different distances from the transmitter.

* * * * *